Feb. 14, 1939.   E. C. HORTON   2,147,405
MOTOR VEHICLE POWER PLANT
Filed Jan. 5, 1935
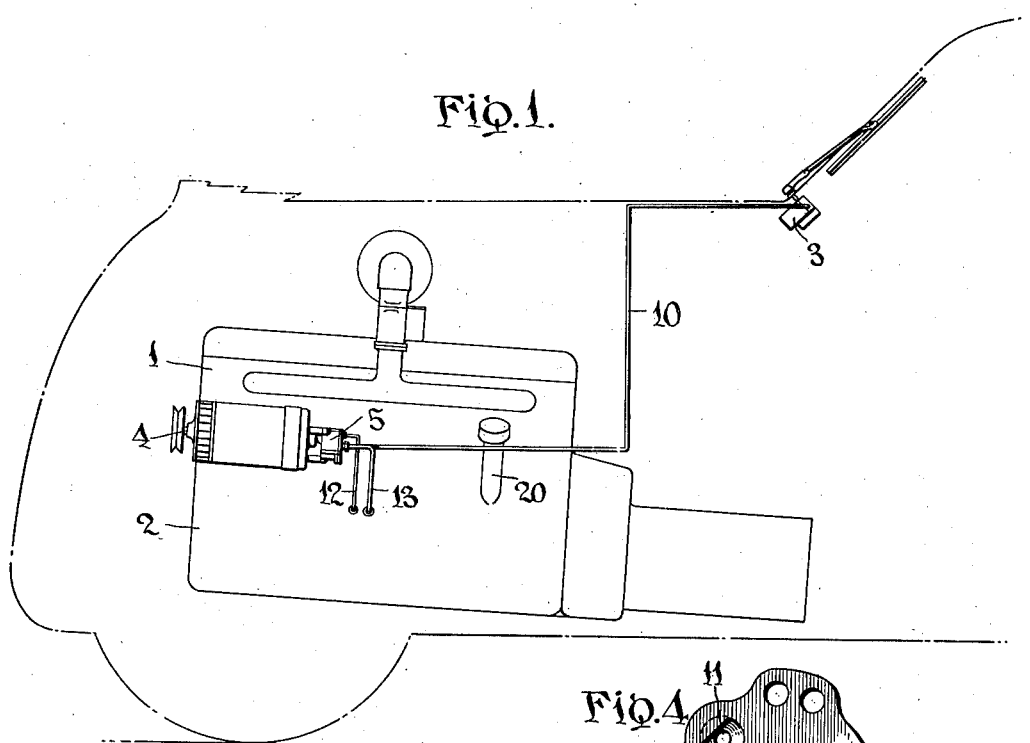
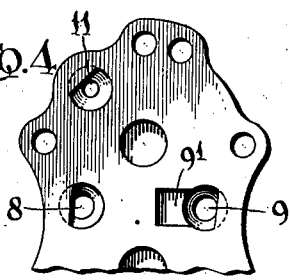
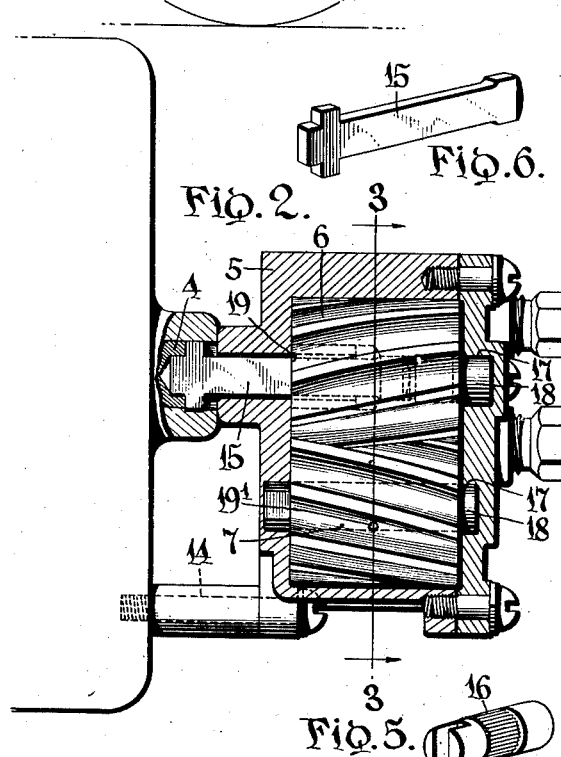
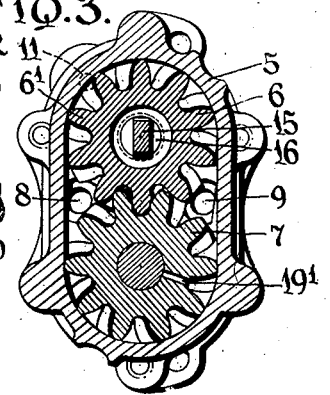
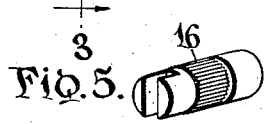
INVENTOR
Erwin C. Horton,
BY
Beau Brooks.
ATTORNEYS Patented Feb. 14, 1939

2,147,405

UNITED STATES PATENT OFFICE 2,147,405

MOTOR VEHICLE POWER PLANT

Erwin C. Horton, Hamburg, N. Y., assignor to Trico Products Corporation, Buffalo, N. Y.

Application January 5, 1935, Serial No. 576

6 Claims. (Cl. 184—6)

This invention relates to a motor vehicle and primarily to the power plant thereof, the aim of the present invention being to improve the power plant both as to its operation and as a source of suction for the operation of suction actuated accessories and devices.

Various attempts have been made to provide a satisfactory and substantially uniform supply of sub-atmospheric pressure for the operation of various types of suction operated devices with which the present day motor vehicles are equipped. Heretofore the low pressure influence maintained in the intake manifold of the power plant has been utilized as the most practical supply, but because of the extreme pressure fluctuations this source has not been wholly satisfactory. It further has been proposed to utilize the lubricating system of the power plant as a means for inducing a low pressure but for various reasons, such as carying the intake air to the bearings for less efficient lubrication, this source has also proved deficient. The efficiency of the lubricating system is also impaired by the engine fuel seeping into the crank case and diluting the lubricant.

The present invention has for an object to provide a source of substantially uniform low or sub-atmospheric pressure in the power plant which is satisfactory in operation and simple in construction. The invention contemplates utilizing a packless air pump, and sealing the air displacing part or parts of the pump with a restricted quantity of oil which has been preconditioned to provide a uniformly constant sealing film of the liquid on such moving parts. The sealing liquid may enter the air pump from the lubricating system of the vehicle power plant and be returned directly to the engine crank case or other reservoir exclusive of the several lubricated engine bearings comprised in the lubricating system. By using the oil from the lubricating system it is preconditioned before entering the pump and thereby insures a substantially uniform sealing film for the piston or air displacing parts of the pump. Further, the invention resides in the embodiment and association of the suction supply with the lubricating system of the power plant in a manner to serve in a rectifying capacity on the engine lubricant whereby the life and efficiency of the lubricant body is materially prolonged.

Referring to the attached drawing, which shows one embodiment of the present invention, Fig. 1 depicts a motor vehicle in fragment and having its power plant embodying the present invention;

Fig. 2 is a longitudinal vertical section through the air pump, parts being left in elevation;

Fig. 3 is a cross sectional view through the pump;

Fig. 4 is a fragmentary inside view of one of the casing plates;

Fig. 5 is a detailed perspective view of the mounting shaft for the driving pump element, and Fig. 6 is a like view of the coupling key or connection to the drive.

Referring more particularly to the drawing, the numeral 1 designates a motor vehicle power plant of the internal combustion type, 2 the crank case serving as an oil reservoir for the lubricating system, and 3 a suction operated accessory, such as a windshield cleaner but which obviously may be any one of the different types of like operated accessories well known to the automotive industry, such as vacuum brakes, vacuum clutches, suction operated horns and signals, and the like.

The suction producer is in the form of an air pump having intermeshing gear-type pumping elements, one of which is driven from a rotating part of the power plant, and for purposes of illustration, the drawing depicts the air pump as being driven from the generator shaft 4, for rendering the same more accessible. The air pump comprises a housing 5 chambered to receive the rotary pistons or intermesting gear pumping elements 6 and 7, the gear pumping element 6 being driven from the rotating part 4 and, through its meshing relation with the gear pumping element 7, constituting a drive for the latter. The pump housing 5 is provided with an air inlet port 8 and a discharge port 9, the inlet port being connected by a passage 10 to the suction operated accessory for withdrawing air therefrom whereby to provide the necessary pressure differential required for its operation.

In the operation of the air pump, the peripheral air pockets provided by the teeth of the intergeared pumping elements receive the air from the air inlet port 8 and carry the same about the axis of rotation for discharge through the outlet port 9 as the air is forced from between the gear teeth of both pumping elements as they move into meshing relation. The peripheral air pockets are closed during their travel from the inlet port to the outlet port, by the wall of the housing chamber, so as to confine the air therein. The air is discharged from the port 9 to the outside atmosphere without producing back pressures.

To increase the efficiency of the pump, the peripheral air pockets have their marginal portions sealed across the clearance space to the adjacent wall portions of the housing chamber, and to effect this sealing, a relatively small quantity of oil is admitted into the housing chamber by a restricted oil port 11. This sealing oil may be obtained from the supply for the engine lubricating system through a passage 12 and is restricted in its entry into the air pump housing sufficiently to seal effectively the peripheral air pockets without materially detracting from the air displacing capacity of the pump. The point of entry of the sealing liquid into the pump chamber is preferably in the path of movement of the air pockets so that after the air pocket, with its low pressure maintaining therein, moves across the oil inlet, a minute quantity of the sealing liquid will be drawn into the pocket for maintaining the desired liquid seal thereabout.

In this connection it will be observed that the sealing oil is delivered to the pump chamber from the engine crank case and consequently is preconditioned by the agitation thereof in the engine lubricating system. By this preconditioning the oil is consistently uniform in its delivery to the pump chamber, it being highly fluid and therefore readily flows into and through the suction pump for thoroughly sealing the metal to metal or other packless contacts between relatively movable parts of the pump. This enables prompt functioning of the suction pump during all weather conditions and insures uniformity in operation. There is no separate packing provided for the air displacing means of the pump; the body of sealing liquid is preconditioned independently of any agitation it may receive from the pump itself so that the sealing liquid will be uniformly consistent as it enters the pump; and following its passage through the pump the sealing liquid will be returned with the exhausted air into the crank case.

As the pump is operated, the air column in the passage 10 will be induced to move into the pump and thus maintain a low pressure in the pipe line leading to the accessory. When the pump is stopped, such low pressure will tend to withdraw the sealing liquid from the pump chamber back into the passage 10 and may pass into the accessory ultimately. However, to counteract substantially this tendency of the oil passing into the passage 10, the oil inlet port 11 is displaced angularly from the air inlet port 8 a sufficient extent to permit one or more of the gear teeth intercepting and blocking communication between the two inlet ports. For instance, in Fig. 3 the gear tooth 6' has closed off its next preceding air pocket about the oil inlet 11 and interrupted communication between such oil inlet and the air inlet port 8. Consequently when the pump comes to rest, oil flow from the oil inlet port 11 to the air inlet port 8 will be practically obstructed against free movement, and since the quantity of sealing liquid within the pump chamber is restricted, very little of the liquid, if any, will be drawn backwardly into the air passage 10. Thus the accessory and its suction line will be kept free of the crank case oil.

Any excess quantity of sealing oil in the pump chamber will be discharged with the outflowing air, and in order to salvage this liquid, the discharge port 9 may have communication with the crank case 2 as by means of the passage 13. The sealing liquid will be transmitted through contact with the teeth of the intermeshing gears so that the peripheral pockets of both the driving and driven gears will be effectively sealed whereby the greatest efficiency of the pump will be obtained.

The sealing oil which enters the pump chamber is subjected to a sub-atmospheric pressure and thus occurs a vaporization of any diluting liquids contained in the oil, such as gasoline, which may pass about the engine pistons down into the crank case to detract from the quality of the lubricant. This low pressure in the pump chamber serves to evaporate the diluting liquid from the lubricant, and since the pump discharge is into the atmosphere and therefore is not subjected to any appreciable recondensing pressure, the air stream ladened with such freed vapors will be carried off free from the lubricant supply. This rectifying action is quite effective in reducing the diluting fluid content if not maintaining the crank case oil substantially free from such diluting fluid. Obviously, the life of the engine lubricant is prolonged for greater engine efficiency.

The air pump may be mounted at a suitable place on the motor vehicle power plant and where it is desired to have the same readily accessible for repair and replacement, it may be mounted for direct drive from the generator shaft, as illustrated in the drawing. One or more attaching bolts 14 may be employed to secure the pump to the generator housing, and coupling between the generator shaft 4 and driving element 6 may be effected by a key like driving connection 15, Fig. 6, which fits a slot in the end of the generator shaft as well as one in the pumping element 6. The latter may embody a reinforced mounting sleeve 16 to receive the driving strains from the key member 15.

The construction of the pump is simplified by sectionalizing the pump housing or casing, the sections being preferably die cast and formed with journal bearings or supports for the pumping elements. The particular showing herein depicts the die cast sections of the housing as having bearings 17 to receive the shaft extensions or trunnions 18 of the respective pumping elements. These bearings are maintained lubricated through ducts 19 and 19'. Each pumping element may have the ducts extending radially inwardly over the end faces, as at 19, or they may be formed intermediate the ends of the pockets as indicated at 19', their function being to provide sufficient lubricant for the journal bearings.

The geared pumping elements may have their teeth spirally disposed for more efficient and quiet operation. By this disposition of the teeth the sealing liquid is more readily released from the bottom of the air pockets as the teeth of the companion gear pumping element enter the same and therefore any knocking or pounding noises are avoided. Further, the sealing liquid is crowded laterally toward the discharge port and thereby tends to minimize the amount of the liquid within the pump chamber for greater air displacement by the pump. The oil ducts 19 and 19' are preferably disposed remote from the ports whereby excess oil will not be crowded thereinto and further, by entering the ducts into the base of the air pockets the oil will be forced through the duct both by the air pressure at the delivery side of the pump and by the incoming teeth of the companion gear. By maintaining the supply of sealing liquid to a minimum the air holding capacity of the peripheral pockets is placed at a maximum, it being only desired to admit a quantity of liquid sufficient to maintain the desired seal between the housing and the moving parts of the pumping elements. This restricted oil supply further insures a very low pressure into which the sealing lubricant is admitted for more efficient rectifying action. It further tends to restrict the supply of the sealing lubricant in the pump chamber subject to retrograde movement in the air inflow passage when the pump has stopped.

The crank case dilution occurs gradually and by having the pump outlet discharging to the atmosphere or to the crank case which is open to the atmosphere through the usual breather tube 20, the released vapors incidental to the rectifying action of the pump are free to escape so as to maintain the engine lubricant in a less diluted state.

From the foregoing it will be observed that a practical and efficient suction air pump is provided which is admirably adapted for motor vehicle equipment so as to provide a substantial uniform suction for the operation of suction operated motor vehicle accessories. The spiral disposition of the teeth is preferable in that it eliminates noise in operation, reduces gear vibration and practically abolishes sound vibration or "whistle", since the line of contact between the companion pump gears is gradually broken from one of the gears to the opposite end thereof. With reference to Fig. 2, it will be observed that the teeth begin their mesh at the left hand side and progressively continue making contact toward the right, and that such contact is likewise broken in a progressive manner so as to avoid sound as the air rushes into the air pockets when the contact is broken. Obviously this progressive contact in the meshing engagement tends to crowd the sealing liquid likewise to the right and therefore it is desirable to provide ample clearance to receive such driven liquid and thereby avoid knocking or sounding of the teeth as they complete their meshing engagement. To this end the discharge port 9 is provided with a communicating recess 9', Fig. 4, to receive such laterally displaced quantity of sealing liquid. The pitch of the spiral is less than one tooth on the periphery of the element or is so proportioned that the total spiral from one end of the gear to the other is less than the angular distance from one tooth to the next tooth. This avoids a spiral leakage path passing through the meshing engagement from the outlet side to the inlet side thereof. In other words the spiral teeth of the pumping elements mesh in such a manner that there will always be a line of contact leading from one extreme end of the gear to the other end thereof, so that the spiral channels will not be able to pass the air from one side of the meshing engagement to the other side. In practice, it has been found that the spiral teeth may be of more or less pitch within certain limits without detracting from the air displacing efficiency of the pumping elements.

It will be noted that the suction or air pump operates on the oil independently of the standard lubricating system of the power plant which latter includes the crank case serving as a reservoir, the usual oil pump and the connecting passages leading to the several bearings of the engine. The lubricating system will function in the regular manner, serving to supply the several engine bearings with the required quantity and quality of lubricant, regardless of the operation of the air or rectifying pump, which latter acts in an independent capacity by removing a portion of the oil from the lubricating system for the necessary sealing of the air pump, serving to rectify such removed quantity of oil, and returns the same to the reservoir where the purified oil co-mingles with the remainder of the lubricant supply for re-use in the lubricating system.

What is claimed is:

1. A motor vehicle having an internal combustion power plant provided with a rotating part and a lubricating system including a reservoir open to the atmosphere, an air pump independent of the lubricating system and having a housing and intermeshing gear-type pumping elements mounted in the housing for rotation, said housing having an air inlet port for being connected to an accessory and an outlet port at the opposite side of the meshing engagement of the pumping elements from the air inlet port, means for operatively connecting one of the rotating pumping elements to said rotating part, whereby both of said pumping elements are adapted for being rotated to carry air in the peripheral pockets between the teeth of said pumping elements from the air inlet port to the air outlet port, and means for admitting a sealing quantity of lubricant from the lubricating system to the housing in a restricted quantity to provide a sealing film of oil insufficient to materially lessen the air displacing capacity of the pump, whereby the admitted lubricant is subjected to a sub-atmospheric pressure condition for effecting partial release of volatile diluting liquid contained in the lubricant, the air outlet port of the pump discharging directly into the reservoir whereby the released vapors will pass out to the atmosphere.

2. The combination with a motor vehicle power plant of the internal combustion type having a lubricating system with the crank case serving as an oil reservoir in open communication with the atmosphere, of power actuated means mechanically agitating a portion of the lubricant supply in the presence of a subatmospheric pressure and independently of the lubricating system to purify the lubricant of volatile impurities, and means for returning such portion to the crank case.

3. In a motor vehicle having an internal combustion power plant provided with a rotating part and an oil containing chamber in which the oil is agitated by and during operation of the power plant for delivery to the several bearings in the lubricating system thereof, said chamber being open to the atmosphere and constituting a part of the lubricating system of the power plant; an air pump having a housing and intermeshing gear-type pumping elements mounted in the housing for rotation, the teeth of such pumping elements forming intervening and peripherally disposed air pockets, said housing having air inlet and outlet ports at opposite sides of the area of meshing engagement of the pumping elements, said inlet port being adapted for connection to a suction line, and means for operatively connecting one of the rotating pumping elements to said rotating part, whereby both of said pumping elements are rotated to intake air through the inlet port and exhaust it through the outlet port, said outlet port being directly connected to said oil containing chamber for discharging directly thereinto, said air pump and chamber having a restricted passage connecting them for supplying the air pump with a lubricating and sealing quantity of the pre-agitated oil for sealing the pumping elements against air leakage and lubricating them, such sealing oil being returned directly to the oil containing chamber through the outlet port and exclusively of the several bearings of the power plant.

4. A motor vehicle having an internal combustion power plant provided with a rotating part and a lubricating system, including an oil containing reservoir open to the atmosphere, an air pump having a housing and intermeshing gear-type pumping elements mounted in the housing for rotation, said housing having an air inlet port for being connected to a suction line and an air outlet port at the opposite side of the area of meshing engagement of the pumping elements from the air inlet port, and means for operatively connecting one of the rotating pumping elements to said rotating part whereby both of said pumping elements are adapted for being rotated to carry air in the peripheral pockets between the teeth of said pumping elements from the air inlet port to the air outlet port, the lubricating system and the pump housing having restricted communication therebetween for admitting to the housing a restricted quantity of the oil to provide a lubricating and sealing film of oil among the intermeshing gear type elements and in volume insufficient to materially lessen the air displacing capacity of the pump, the lubricating and sealing oil being maintained in a highly fluid state by the lubricating system of the power plant for ready passage through the air pump, said outlet port having a direct communication with the reservoir of the lubricating system for returning the spent lubricating and sealing oil directly back into the lubricating system along with the air exhaust.

5. The combination with a motor vehicle power plant of the internal combustion type having a lubricating system with a crank case constituting an oil containing reservoir in open communication with the atmosphere, and wherein the power plant agitates the oil in the reservoir and increases its fluidity; power actuated suction producing means providing an area of subatmospheric pressure wherein agitating means is included for agitating and aerating oil and said means being outside the range of normal lubricating activity of the oil passing to the operating power plant parts; said suction producing means having an air inlet connection, inlet communicating means connected to the oil reservoir and to the suction producing means for directing to the latter means a restricted supply of oil in its state of increased fluidity whereby such restricted supply of oil is agitated and aerated in the presence of subatmospheric pressure; and outlet communicating means also connected to the oil reservoir and to the suction producing means discharging the agitated and aerated supply of oil directly back into the atmospheric pressure area inside the reservoir.

6. In a motor vehicle having an internal combustion power plant provided with a rotating part and an oil containing chamber in which the oil is agitated by and during operation of the power plant for delivery to the several bearings in the lubricating system thereof, said chamber being open to the atmosphere and constituting a part of the lubricating system of the power plant; an air pump having a housing and fluid displacing means including a non-expansible pumping member mounted for curvilinear movement in the housing and having its opposite end faces and a transverse face portion connecting said end faces all in sliding engagement with the inner wall thereof, said housing having air inlet and outlet ports, said inlet port being adapted for connection to a suction line, and means for operatively connecting the pumping member to said rotating part, whereby to intake air through the inlet port and exhaust it through the outlet port, said outlet port being directly connected to said oil containing chamber for discharging directly thereinto, said air pump and chamber having a restricted passage connecting them for supplying the air pump with a lubricating and sealing quantity of the preagitated oil for sealing the pumping member to the inner wall of the housing against air leakage and lubricating such sliding engagement, such sealing oil being returned directly to the oil containing chamber through the outlet port and exclusively of the several bearings of the power plant.

ERWIN C. HORTON.